United States Patent
Kim et al.

(10) Patent No.: US 10,067,666 B2
(45) Date of Patent: Sep. 4, 2018

(54) USER TERMINAL DEVICE AND METHOD FOR CONTROLLING THE SAME

(71) Applicant: SAMSUNG ELECTRONICS CO., LTD., Suwon-si (KR)

(72) Inventors: Dae-myung Kim, Hwaseong-si (KR); Shi-yun Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 295 days.

(21) Appl. No.: 14/834,521

(22) Filed: Aug. 25, 2015

(65) Prior Publication Data

US 2016/0202869 A1     Jul. 14, 2016

Related U.S. Application Data

(60) Provisional application No. 62/101,016, filed on Jan. 8, 2015.

(30) Foreign Application Priority Data

Feb. 3, 2015   (KR) .......................... 10-2015-0016664

(51) Int. Cl.
G06F 3/048        (2013.01)
G06F 3/0488       (2013.01)
G06F 1/16         (2006.01)
G06F 3/0482       (2013.01)

(52) U.S. Cl.
CPC .......... *G06F 3/0488* (2013.01); *G06F 1/1626* (2013.01); *G06F 1/1652* (2013.01); *G06F 1/1692* (2013.01); *G06F 1/1694* (2013.01); *G06F 3/0482* (2013.01)

(58) Field of Classification Search
CPC .... G06F 3/0488; G06F 1/1626; G06F 1/1652; G06F 1/1692; G06F 1/1694; G06F 3/0482
USPC ........................................... 715/841
See application file for complete search history.

(56) References Cited

U.S. PATENT DOCUMENTS

| | | | | |
|---|---|---|---|---|
| 9,292,201 B2 * | 3/2016 | Joo | ..................... | G06F 3/04886 |
| 9,720,529 B2 * | 8/2017 | Tae | ........................ | G06F 3/041 |
| 9,762,792 B2 * | 9/2017 | Holz | .................. | H04N 5/23219 |
| 2009/0184935 A1 * | 7/2009 | Kim | ....................... | G06F 3/0416 |
| | | | | 345/173 |
| 2011/0107209 A1 * | 5/2011 | Ha | ....................... | G06F 3/0488 |
| | | | | 715/702 |

(Continued)

FOREIGN PATENT DOCUMENTS

KR        10-1413187 B1       7/2014

*Primary Examiner* — David Phantana-angkool
(74) *Attorney, Agent, or Firm* — Sughrue Mion, PLLC

(57) ABSTRACT

A user terminal device includes: a flexible display that is divided into a main area, which is disposed on a front surface, and a sub area, which includes a bent portion extending from the main area toward a side surface; a touch sensor configured to receive a touch input of a user in at least one of the main area and the sub area; and a controller configured to, in response to a predetermined event occurring, control the flexible display to display, in the main area, a plurality of user interface (UI) elements, and in response to one of the plurality of UI elements displayed in the main area being selected, control the flexible display to display the selected UI element in the sub area.

15 Claims, 23 Drawing Sheets

(56) References Cited

U.S. PATENT DOCUMENTS

| | | | |
|---|---|---|---|
| 2012/0075212 A1* | 3/2012 | Park | G06F 3/04886 345/173 |
| 2013/0009890 A1* | 1/2013 | Kwon | G06F 3/04886 345/173 |
| 2013/0300697 A1* | 11/2013 | Kim | G06F 1/1626 345/173 |
| 2014/0125612 A1* | 5/2014 | Park | G06F 3/0416 345/173 |
| 2014/0253477 A1* | 9/2014 | Shim | G06F 3/0416 345/173 |
| 2016/0062515 A1* | 3/2016 | Bae | G06F 3/0414 345/174 |
| 2016/0191837 A1* | 6/2016 | Huh | H04N 5/4403 348/564 |
| 2016/0202869 A1* | 7/2016 | Kim | G06F 3/0488 715/841 |

* cited by examiner

FIG. 18
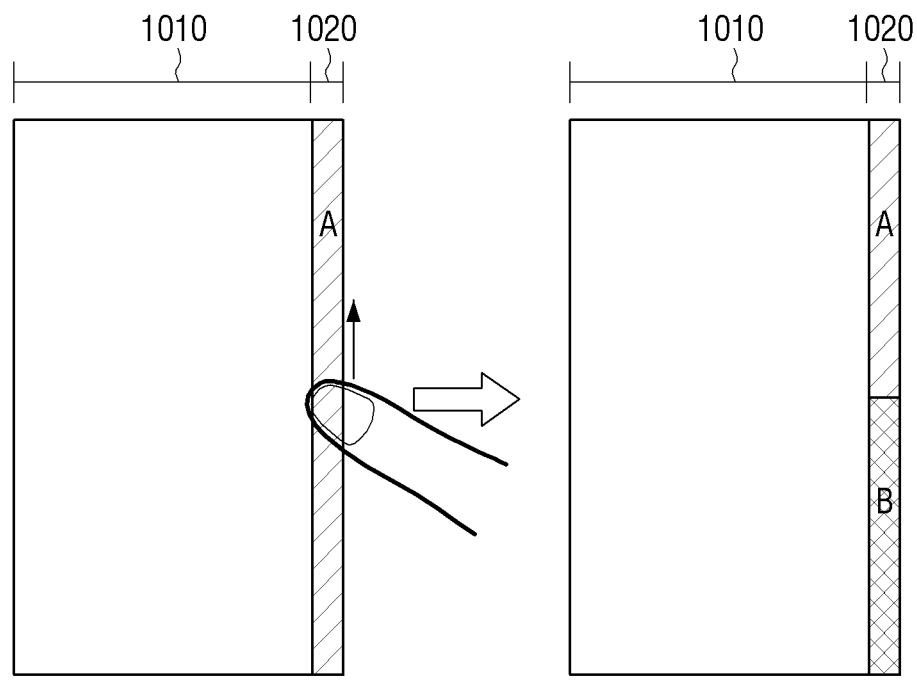
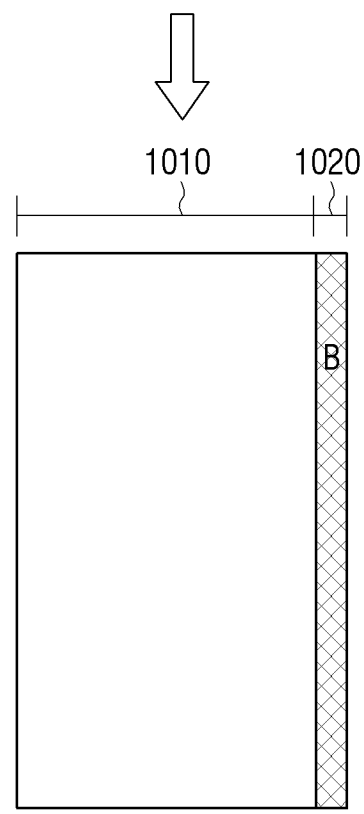

USER TERMINAL DEVICE AND METHOD FOR CONTROLLING THE SAME

CROSS-REFERENCE TO RELATED APPLICATION(S)

This application claims the benefit under 35 U.S.C. § 119 from U.S. Provisional Application No. 62/101,016, filed on Jan. 8, 2015, in the United States Patent and Trademark Office, and priority from Korean Patent Application No. 10-2015-0016664, filed on Feb. 3, 2015, in the Korean Intellectual Property Office, the disclosures of which are incorporated herein by reference in their entireties.

BACKGROUND

1. Field

Apparatuses and methods consistent with exemplary embodiments relate to a user terminal device and a method for controlling the same, and more particularly, to a user terminal device that receives a user interaction using a flexible display that includes a main area and a sub area, which extends from the side surface of the main area, and a method for controlling the same.

2. Description of Related Art

Due to technology advancements, various kinds of user terminal devices are being developed and distributed. In recent years, there has been increased demand for more user terminal devices since the size of user terminal devices has become smaller while their functionality has increased.

A user terminal device may provide various contents such as multimedia contents or applications according to a user's request. The user may select a desired function with a button or a touch screen provided on the user terminal device. The user terminal device may execute a program according to an interaction with the user and display the result.

As functionality increases and functions becomes more complex, there is a need for more methods of displaying content and for more methods of user interaction. That is, as the kinds of contents and functions greatly increase, a related-art interaction method such as simply selecting a button or touching a touch screen does not meet a user's need.

Therefore, there is a need for user interaction methods that make it easier to use the user terminal devices.

SUMMARY

One or more exemplary embodiments may overcome the above disadvantages and other disadvantages not described above. However, it should be understood that one or more exemplary embodiments are not required to overcome the disadvantages described above, and may not overcome any of the problems described above.

One or more exemplary embodiments relate to a user terminal device that can support various user interactions using a flexible display, including a main area and a sub area that is extended from the side surface of the main area, and a method for controlling the same.

According to an aspect of an exemplary embodiment, there is provided a user terminal device including: a flexible display that is divided into a main area, which is disposed on a front surface of the user terminal device, and a sub area, which includes a bent portion extending from the main area toward a side surface of the user terminal device; a touch sensor configured to receive a touch input of a user in at least one of the main area and the sub area; and a controller configured to, in response to a predetermined event occurring, control the flexible display to display, in the main area, a plurality of user interface (UI) elements, and in response to one of the plurality of UI elements displayed in the main area being selected, control the flexible display to display the selected UI element in the sub area.

The predetermined event may be a touch gesture moving from the sub area to the main area.

The controller may be further configured to control the flexible display to adjust a number of UI elements displayed in the main area according to a length of the touch gesture.

In response to sensing that the touch gesture is released, the controller may be configured to control the flexible display to display a UI element placed in a predetermined location in the sub area.

In response to sensing that a multi-touch gesture continues from the sub area to the main area, the controller may be configured to control the flexible display to display, in the main area, a screen for editing the UI elements that are displayed in the sub area.

In response to sensing a predetermined touch gesture corresponding to at least one of the plurality of UI elements that are displayed in the main area, the controller may be further configured to exclude the UI element to which the predetermined touch gesture corresponds from pre-registered UI elements that are displayed in the sub area.

The predetermined touch gesture may be a touch gesture for separating one of the plurality of UI elements displayed in the main area from the other UI elements displayed in the main area.

In response to sensing a flick gesture in the sub area, the controller may be further configured to control the flexible display to change the UI element displayed in the sub area to another pre-registered UI element.

The sub area may be divided into a plurality of sub areas, and in response to sensing a touch gesture moving from one of the plurality of sub areas to the main area, the controller may be configured to control the flexible display to display sub menus corresponding to the sub area in the main area.

According to an aspect of another exemplary embodiment, there is provided a method for controlling a user terminal device, the method including: dividing a flexible display into a main area, which is disposed on a front surface of the user terminal device, and a sub area, which includes a bent portion extending from the main area toward a side surface of the user terminal device; receiving a touch input of a user in at least one of the main area and the sub area; in response to a predetermined event occurring, displaying, in the main area, a plurality of user interface (UI) elements; and in response to one of the plurality of UI elements displayed in the main area being selected, displaying the selected UI element in the sub area.

The predetermined event may be a touch gesture moving from the sub area to the main area.

The displaying the plurality of UI elements in the main area may include adjusting a number of UI elements displayed in the main area according to a length of the touch gesture.

The displaying the UI element in the sub area may include, in response to sensing that the touch gesture is released, displaying a UI element in a predetermined location in the sub area.

The method may further include, in response to sensing that a multi-touch gesture continues from the sub area to the main area, displaying, in the main area, a screen for editing the UI elements that are displayed in the sub area.

The method may further include, in response to sensing a predetermined touch gesture corresponding to at least one of the plurality of UI elements that are displayed in the main area, excluding the UI element to which the predetermined touch gesture corresponds from pre-registered UI elements that are displayed in the sub area.

The predetermined touch gesture may be a touch gesture for separating one of the plurality of UI elements displayed in the main area from the other UI elements displayed in the main area.

The method may further include, in response to sensing a flick gesture in the sub area, changing the UI element displayed in the sub area to another pre-registered UI element.

The method may further include dividing the sub area into a plurality of sub areas, and in response to sensing a touch gesture moving from one of the plurality of sub areas to the main area, displaying sub menus corresponding to the sub area in the main area.

According to an aspect of another exemplary embodiment, there is provided a computer readable recording medium which includes a program for executing a method for controlling a user terminal device, the method including: dividing a flexible display into a main area, which is placed on a front surface of the user terminal device, and a sub area, which includes a bent portion extending from the main area toward a side surface of the user terminal device; receiving a touch input of a user in at least one of the main area and the sub area; in response to a predetermined event occurring, displaying, in the main area, a plurality of user interface (UI) elements; and in response to one of the plurality of UI elements displayed in the main area being selected, displaying the selected UI element in the sub area.

According to an aspect of another exemplary embodiment, there is provided a method for controlling a user terminal device, the method including: displaying a plurality of user interface (UI) elements on a flexible display, wherein the flexible display comprises a main area on a front surface and a sub area on a side surface; receiving a touch input in at least one of the main area and the sub area; adjusting a placement of the UI elements displayed on the flexible display according to the received touch input.

The method may further include wherein the adjusting the placement of the UI elements comprises, in response to the received touch input being a touch gesture for selecting one of the UI elements and sliding the UI element, adjusting an order of the UI elements on the flexible display.

The method may further include, in response to the received touch input being a touch gesture for selecting one of the UI elements and swiping up, removing the selected UI element from the display.

According to one or more exemplary embodiments as described above, the user can be provided with various user experiences using the flexible display including the main area and the sub area. Therefore, user convenience and satisfaction can be enhanced.

BRIEF DESCRIPTION OF THE DRAWINGS

The above and/or other aspects, features, and advantages of exemplary embodiments will be apparent from the following description, taken in conjunction with the accompanying drawings, in which:

FIGS. 13 to 22B are views illustrating examples of a screen that is displayed on a user terminal device according to one or more exemplary embodiments.

DETAILED DESCRIPTION

Figure 1:
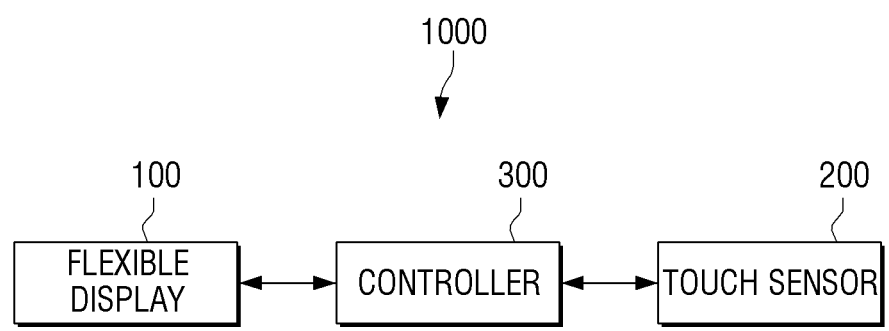
FIG. 1 is a block diagram illustrating a configuration of a user terminal device according to an exemplary embodiment.

Although one or more exemplary embodiments are illustrated in the drawings and detailed description, various changes can be made to exemplary embodiments. Accordingly, the present disclosure is not limited to any exemplary embodiment and should be construed as including any changes, equivalents or substitutes included in the ideas and technological scopes of one or more exemplary embodiments. Also, in the following description, well-known functions or constructions might not be described in detail if the description would obscure the present disclosure with unnecessary detail.

Although terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element.

Expressions such as "at least one of," when preceding a list of elements, modify the entire list of elements and do not modify the individual elements of the list.

The terms used in one or more exemplary embodiments are used for explanation only and are not intended to limit the scope of the present disclosure. As used herein, the singular forms are intended to include the plural forms as well, unless the context clearly indicates otherwise. The terms "include" or "comprise" used in exemplary embodiments indicate the presence of disclosed corresponding features, numbers, steps, operations, elements, parts or a combination thereof, and do not preclude the presence or addition of one or more other features, numbers, steps, operations, elements, parts, or a combination thereof.

The terms "module" or "unit" used in one or more exemplary embodiments perform at least one function or operation and may be implemented by using hardware or software, or a combination of hardware and software. In addition, a plurality of "modules" or a plurality of "units" may be integrated into at least one module and implemented by using at least one processor, except for "modules" or "units" which need to be implemented by using specific hardware.

Hereinafter, one or more exemplary embodiments will be explained with reference to the accompanying drawings.

FIG. 1 is a block diagram showing an example of a basic configuration of a user terminal device according to one or more exemplary embodiments. The user terminal device 1000 of FIG. 1 may be implemented with various kinds of devices such as a television (TV), a Personal Computer (PC), a laptop PC, a mobile phone, a tablet PC, a Personal Digital Assistant (PDA), an MP3 player, a kiosk, an electronic album, a table display device, or the like. When the user terminal device 1000 is implemented with a portable device, such as a mobile phone, a tablet PC, a PDA, an MP3 player, a laptop PC, or the like, the user terminal device may be named "a mobile device." However, in the following description, the term "user terminal device" is commonly used for simplicity.

Referring to FIG. 1, the user terminal device 1000 includes a flexible display 100, a touch sensor 200, and a controller 300.

The flexible display 100 is divided into a main area and at least one sub area. Herein, the main area and the sub area may be defined in many different ways. For example, a main area may be defined as a relatively larger area of the two areas, while a sub area may be defined as a relatively smaller area. Also, a main area may be defined as an area that is located on the same surface as the surface on which a home button to return to a home screen or a front speaker is arranged, while a sub area may be defined as an area which is located on the side surface. Also, the main area may refer to an area where a UI located thereon can be directly controlled, while the sub area may refer to an area where the UI of the main area can be controlled.

The sub area may be smaller than the main area. Also, the at least one sub area may be on a different surface from that of the main area. For example, if the main area is placed on a front surface of the user terminal device 1000, the at least one sub area may be placed on different surfaces such as at least one of a right side surface, a left side surface, and a back surface, from among the surfaces forming the exterior of the user terminal device 1000. Also, the surface including the main area (a plane or a curve) and the surface including the at least one sub area (a plane or a curve) may be fixed to form an obtuse angle between the surfaces. The shape, location, and number of the one or more sub areas may be implemented in many ways. For example, if the sub area is placed on a side surface from among the surfaces forming the exterior of the user terminal device 1000, the sub area may be referred to as an edge area.

The touch sensor 200 may sense a user touch on at least one of the main area and the sub area. The touch sensor 200 may include at least one of a touch panel and a pen/stylus recognition panel. The touch panel may sense a user's finger gesture input and output a touch event value corresponding to a sensed touch signal. The touch panel may be mounted under at least one of the main area and the sub area of the flexible display 100. The touch panel may sense the user's finger gesture input with a capacitive method or a resistive method. The capacitive method is a method for calculating touch coordinates by sensing minute electricity caused in a user's body. The resistive method includes two electrode plates embedded in a touch panel and calculates touch coordinates by sensing a current which flows as the upper and lower plates of a touched point are in contact with each other.

The pen/stylus recognition panel may sense a user's pen gesture input accompanied by the operation of a user's touch pen (for example, a stylus pen or a digitizer pen), and output a pen proximity event value or a pen touch event value. The pen recognition panel may be mounted under at least one of the main area and the plurality of sub areas. The pen recognition panel may be implemented with an electromagnetic resonance (EMR) method and may sense a touch or a proximity input according to a change in the strength of an electromagnetic field caused by an approach or touch of a pen. Also, the pen recognition panel may include an electronic induction coil sensor having a grid structure, and an electronic signal processor which provides an alternating current signal having a predetermined frequency to each loop coil of the electronic induction coil sensor serially. When a pen having a resonance circuit embedded therein comes into a proximity (which may be a predetermined proximity or may be set by a user) of the loop coil of the pen recognition panel, a magnetic field transmitted from the corresponding loop coil generates a current based on mutual electronic induction in the resonance circuit of the pen. An induction magnetic field is generated from the coil constituting the resonance circuit in the pen based on this current, and the pen recognition panel may detect the induction magnetic field in the loop coil which is receiving signals, thereby sensing an approach location or a touch location of the pen.

The controller 300 may control the display of the main area and the at least one sub area of the flexible display 100. For example, the controller 300 may control the display to display a UI element on the sub area and/or the main area. The kind or type of UI element, display method of UI element, and layout of the UI element that is displayed on the sub area and the main area may be varied according to one or more exemplary embodiments. This will be explained in detail below.

Figure 2:
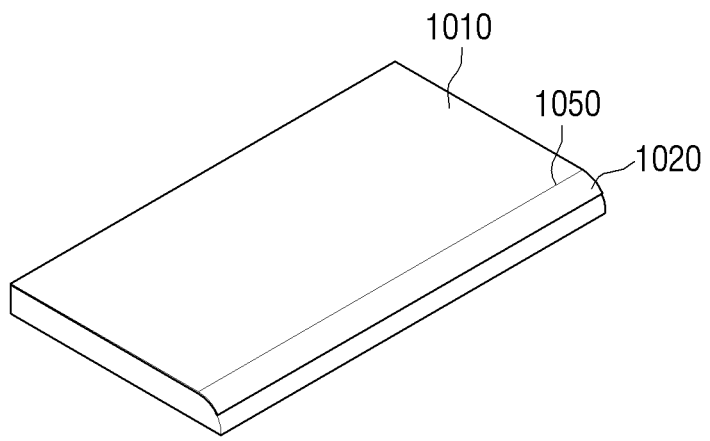
FIGS. 2 to 10 are views illustrating examples of a configuration of a flexible display according to one or more exemplary embodiments.

FIG. 2 is a view illustrating an example of an exterior configuration of a user terminal device that includes a flexible display divided into one sub area and a main area.

Referring to FIG. 2, the flexible display 100 is divided into a main area 1010 which is placed on a front surface of the user terminal device 1000, and a sub area 1020 which is placed on a right side surface of the user terminal device 1000. In FIG. 2, the main area 1010 and the sub area 1020 are distinguished from each other with reference to a boundary area 1050. If the flexible display 100 is bent, the boundary area 1050 may be referred to as a bending line.

Figure 3:
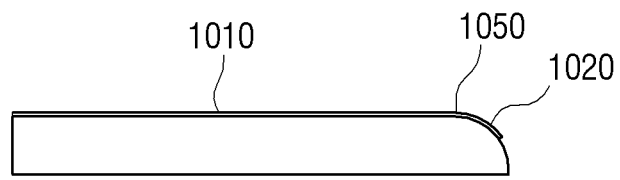

FIG. 3 is a view illustrating a cross section configuration of a user terminal device of FIG. 2. Referring to FIG. 3, the main area 1010 and the sub area 1020 of the flexible display 100 are placed on the front surface of the user terminal device and a side surface of the user terminal device 1000, respectively.

Figure 4:
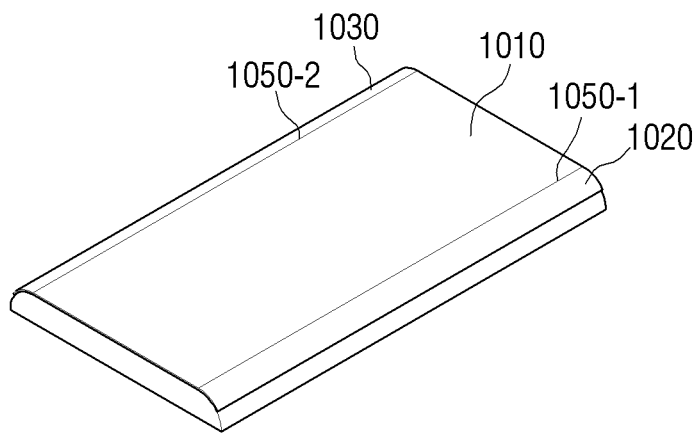

FIG. 4 is a view illustrating an example of an exterior configuration of a user terminal device that includes a flexible display divided into two sub areas and a main area.

Referring to FIG. 4, the main area 1010 is placed on the front surface and the sub areas 1020, 1030 are placed on the right side surface and the left side surface, respectively. The main area 1010 and the sub areas 1020, 1030 are distinguished from each other by boundary areas 1050-1, 1050-2.

Figure 5:
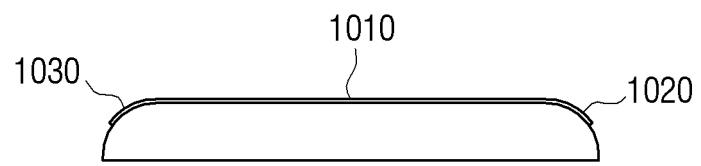

FIG. 5 is a view illustrating the cross section configuration of a user terminal device 1000 of FIG. 4. Referring to FIG. 5, the sub areas 1020, 1030 may be formed at an obtuse angle with the main area 1010, so that the sub areas 1020, 1030 can be viewed from the front.

Figure 6:
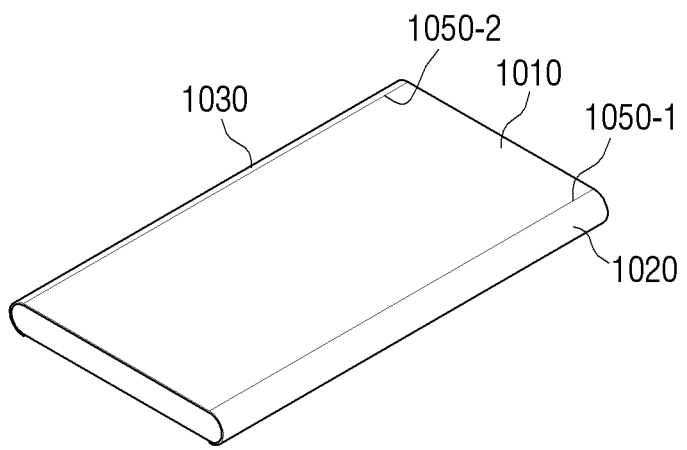
Figure 7:
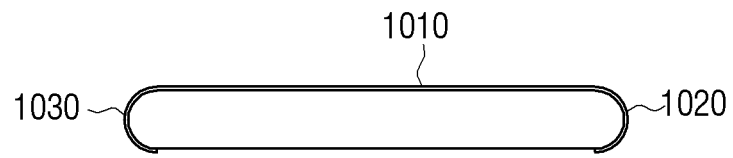

FIGS. 6 and 7 are views illustrating another example of a user terminal device including a flexible display which is divided into two sub areas and a main area. Referring to FIG. 6, the two sub areas 1020, 1030 are placed on opposite side surfaces of the main area 1010 and may be fixed at an angle so that the sub areas 1020, 1030 can be viewed from the right and left side but not the front. That is, referring to FIG. 7, the sub areas 1020, 1030 may be bent from the surface including the main area 1010 by about 90 degrees.

According to another exemplary embodiment, the sub area may be placed on a surface that is opposite to the main area 1010.

Figure 8:
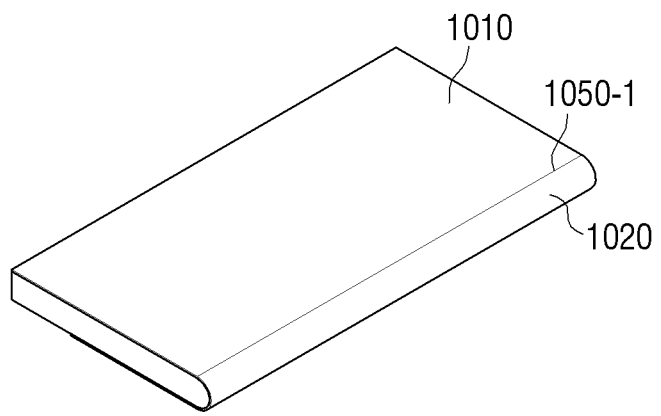
Figure 9:
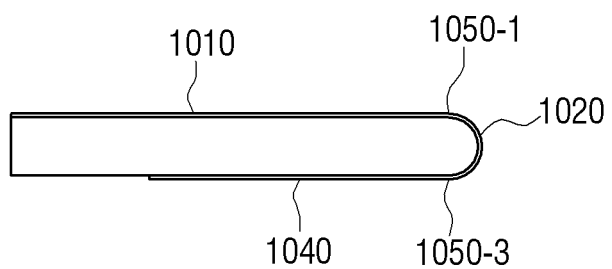

FIGS. 8 and 9 are views illustrating another example of the user terminal device including the flexible display which is divided into two sub areas and a main area. Referring to FIGS. 8 and 9, the flexible display 100 is divided into a main area 1010 formed on the front surface, a first sub area 1020 formed on the side surface, and a second sub area 1040 formed on the rear surface. As shown in FIG. 9, the second sub area 1040 may not cover the whole rear surface and may be formed on only a part of the rear surface. However, it is not limited to this. Second sub area 1040 may cover the entire rear surface. The controller 300 may distinguish the main area 1010, the first sub area 1020, and the second sub area 1040 from one another with reference to a first boundary area 1050-1 and a third boundary area 1050-3, and may display different content on each area.

In FIGS. 3 to 9, the sub areas 1020, 1030, 1040 are bent in a rounded shape, but they may be configured in a planar shape. In this case, the plane including the main area 1010 and the plane including the sub area 1020, 1030, and 1040 may contact each other along the boundary line. That is, the boundary area 1050-1, 1050-2, and 1050-3 may be of a line shape.

Also, the user terminal device 100 may have a triangular cross section. In this example, the surface including the main area 1010 and the surface including the sub area 1020 are connected with each other to form an obtuse angle (A) at the boundary area 1050. In addition, the cross section configuration may have various shapes such as a trapezoidal shape, a pentagonal shape, a hexagonal shape, an octagonal shape, etc.

In the above-described examples, the flexible display 100 is bent on the longer end of the user terminal device. However, this should not be considered as limiting. That is, the flexible display 100 may be bent on the shorter end of the user terminal device 1000.

Figure 10:
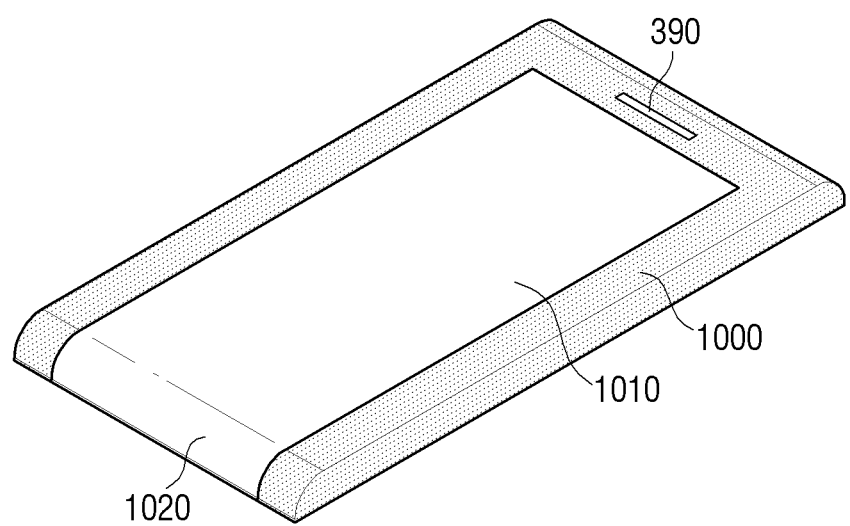

FIG. 10 is a view illustrating the flexible display 100 which is bent on the shorter end of the user terminal device. Specifically, the flexible display 100 may be divided into a main area 1010 which is placed on the front surface of the user terminal device 1000, and a sub area 1020 which is placed on the lower side surface. A speaker 390 may be placed on the upper portion of the main area 1010.

In FIG. 1, the configuration of the user terminal device including the flexible display 100, the touch sensor 200, and the controller 300 is illustrated. However, according to an exemplary embodiment, the user terminal device 1000 may further include various other elements. For example, the user terminal device 1000 may further include a memory that stores various applications. The controller 300 may execute an application that is stored in a memory according to a sensed user gesture, and display content provided by the application on at least one of the main area and the sub area.

In addition, the user terminal device 1000 may be configured in various shapes.

Figure 11:
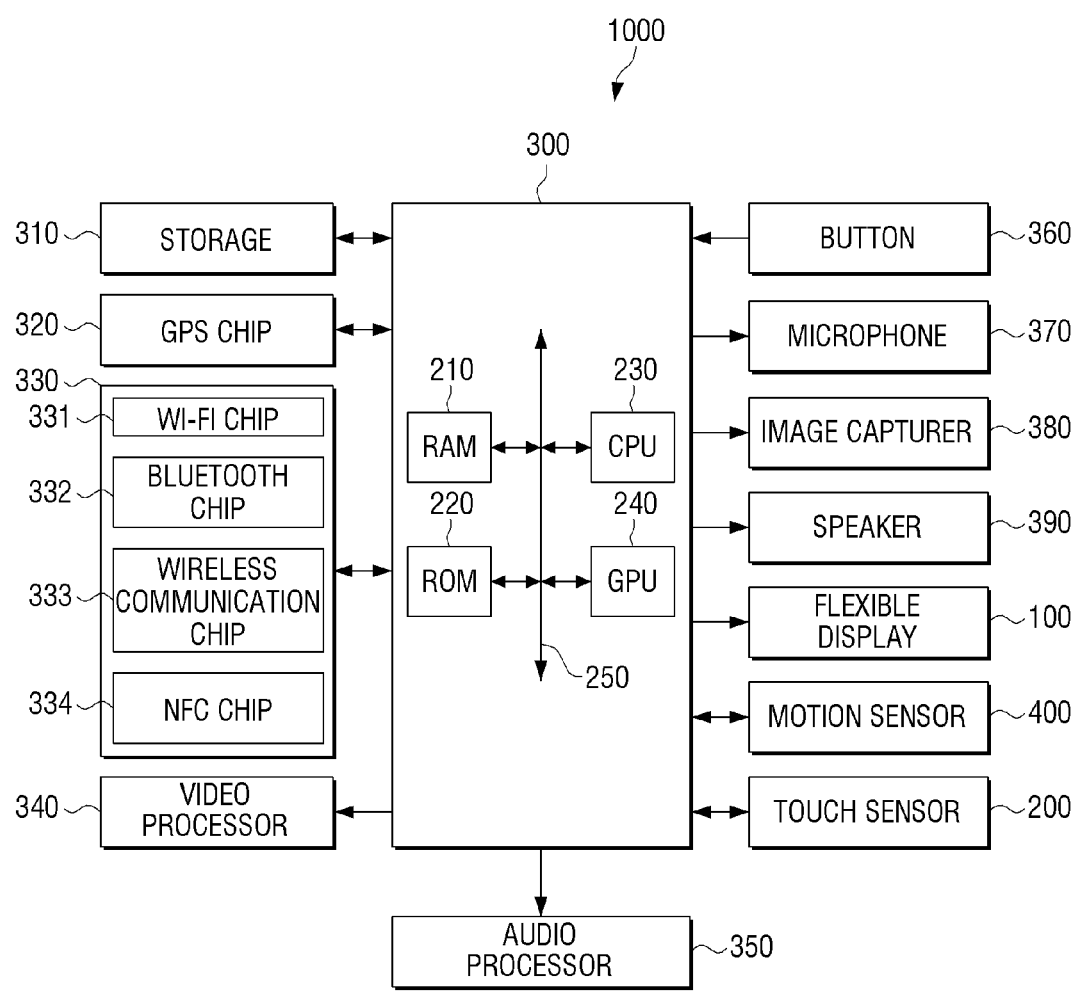
FIG. 11 is a block diagram illustrating a configuration of a user terminal device according to an exemplary embodiment.

FIG. 11 is a block diagram illustrating an example of a detailed configuration of a user terminal device 1000 which is implemented with a mobile phone. Referring to FIG. 11, the user terminal device 1000 includes a flexible display 100, a touch sensor 200, a controller 300, a storage 310 (e.g., memory), a Global Positioning System (GPS) chip 320, a communicator 330, a video processor 340, an audio processor 350, a button 360, a microphone 370, an image capturer 380, a speaker 390, and a motion sensor 400.

The flexible display 100 may be divided into a main area and at least one sub area as described above. The flexible display 100 may be implemented with various types of displays such as a Liquid Crystal Display (LCD), an Organic Light Emitting Diode (OLED) display, a Plasma Display Panel (PDP), and the like. The flexible display 100 may include a driving circuit or a backlight unit which may be implemented in the form of an amorphous silicon (a-si) TFT, a Low Temperature Poly Silicon (LTPS) TFT, an organic TFT, or the like.

The touch sensor 200 may include a touch sensor for sensing a user's touch input or gesture. The touch sensor may be implemented with various types of sensors such as at least one of a capacitive sensor, a resistive sensor, a piezoelectric sensor, and the like. The capacitive sensing refers to a method that, when a part of a user's body touches a touch screen surface, calculates touch coordinates by sensing minute electricity excited in the user's body using dielectric coated on the touch screen surface. The resistive sensing refers to a method that includes two electrode plates embedded in a touch screen, and, when a user touches the screen, calculates touch coordinates by sensing a current flowing as the upper and lower plates of the touched point are in contact with each other. In addition, when the user terminal device 1000 supports a pen input function, the bended touch screen 100 may detect a user gesture using an inputting means such as a pen in addition to a user's finger. When the inputting means is a stylus pen including a coil therein, the user terminal device 1000 may include a magnetic field sensor for sensing a magnetic field which is changed by the coil in the stylus pen. Accordingly, the user terminal device 1000 may detect not only the touch gesture but also a proximity gesture, e.g., hovering.

The storage 310 may store various programs and data necessary for the operations of the user terminal device 1000. Specifically, the storage 310 may store programs and data for configuring various screens to be displayed on the main area and the at least one sub area.

The controller 300 may display a UI element on the main area and the at least one sub area of the flexible display 100 using the programs and data stored in the storage 310. In addition, the controller 300 may display a continuous UI element throughout the main area and the at least one sub area.

The controller 300 may include a Random Access Memory (RAM) 210, a Read Only Memory (ROM), a Central Processing Unit (CPU) 230, a Graphics Processing Unit (GPU) 240, and a bus 250. The RAM 210, the ROM 220, the CPU 230, and the GPU 240 may be connected with one another through the bus 250.

The CPU 230 accesses the storage 310 and performs booting using an Operating System (O/S) stored in the storage 310. In addition, the CPU 230 performs various operations using various programs, contents, and data stored in the storage 310.

The ROM 220 stores a set of commands for booting a system. When a turn-on command is input and power is supplied, the CPU 230 copies the 0/S stored in the storage 310 onto the RAM 210 according to the command stored in the ROM 220, executes the 0/S and boots the system. When booting is completed, the CPU 230 copies various programs stored in the storage 310 onto the RAM 210, executes the programs copied onto the RAM 210, and performs various operations. When the booting of the user terminal device 1000 is completed, the GPU 240 displays a UI element on an activated area of the main area and the at least one sub area. Specifically, the GPU 240 may generate a screen including various objects such as icons, images, text, and the like, using a calculator and a renderer. The calculator determines attribute values of the objects to be displayed such as coordinate values, shape, size, color, etc. of the objects according to the layout of the screen. The renderer generates the screen with various layouts including the objects based on the attribute values calculated by the calculator. The screen generated by the renderer is provided to the bended touch screen 100 and displayed on the main area and the at least one sub area.

The GPS chip 320 is an element for receiving a GPS signal from a GPS satellite and calculating a current location of the user terminal device 1000. The controller 300 may calculate the location of the user using the GPS chip 320 when a navigation program is used or the current location of the user is needed.

The communicator 330 is configured to communicate with various kinds of external devices in various communication methods. The communicator 330 includes a Wi-Fi chip 331, a Bluetooth chip 332, a wireless communication chip 333, a Near Field Communication (NFC) chip 334. The controller 300 may communicate with the various kinds of external devices using the communicator 330.

The Wi-Fi chip 331 and the Bluetooth chip 332 communicate with a Wi-Fi method and a Bluetooth method, respectively. When the Wi-Fi chip 331 or the Bluetooth chip 332 is used, a variety of connection information such as a Service Set Identifier (SSID) and a session key may be exchanged first, and communication may be established using the connection information, and then a variety of information may be exchanged. The wireless communication chip 333 communicates according to various communication standards such as IEEE, Zigbee, $3^{rd}$ Generation (3G), $3^{rd}$ Generation Partnership Project (3GPP), Long Term Evolution (LTE), and the like. The NFC chip 334 operates in an NFC method using a band of 13.56 MHz from among various RFID frequency bands such as 135 kHz, 13.56 MHz, 433 MHz, 860-960 MHz, and 2.45 GHz.

The video processor 340 is an element for processing content received through the communicator 330 or video data included in the content stored in the storage 310. The video processor 340 may perform various image processing operations on the video data, such as decoding, scaling, noise filtering, frame rate conversion, resolution conversion, and the like.

The audio processor 350 is an element for processing audio data included in content received through the communicator 330 or content stored in the storage 310. The audio processor 350 may perform various processing operations on the audio data such as decoding, amplifying, noise filtering, and the like.

In response to a reproduction program for a multimedia content being executed, the controller 300 drives the video processor 340 and the audio processor 350 to reproduce the corresponding content.

The flexible display 100 may display an image frame which is generated in the video processor 340 on at least one of the main area and the sub area.

In addition, the speaker 390 outputs audio data that is generated in the audio processor 350.

The button 360 may be various types of buttons formed on an area of the exterior of the body of the user terminal device 1000, such as a front surface, a side surface, a rear surface, or like. The button 360 may be at least one of a physical button, a touch pad, a wheel, and the like.

The microphone 370 is an element for receiving a user voice or other sounds and converting the user voice or other sounds into audio data. The controller 300 may use the user voice inputted through the microphone 370 for a call process or convert the user voice into audio data and store the audio data in the storage 310.

The image capturer 380 is an element for photographing a still image or a moving image under control of the user. The image capturer 380 may be implemented with a plurality of cameras such as a front camera and a rear camera. As described above, the image capturer 380 may also be used as a means for obtaining a user's image in an exemplary embodiment for tracing a user's gaze.

When the image capturer 380 and the microphone 370 are provided, the controller 300 may perform a control operation according to a user voice which is inputted through the microphone 370 or a user motion which is recognized by the image capturer 380. That is, the user terminal device 1000 may be operated in a motion control mode and/or a voice control mode. In the motion control mode, the controller 300 may activate the image capturer 380 to photograph the user, trace a change in the user's motion, and perform a corresponding control operation. In the voice control mode, the controller 300 may analyze a user voice inputted through the microphone 370 and operate in a voice recognition mode in which a control operation is performed according to the analyzed user voice.

In the user terminal device 1000 in which the motion control mode and/or the voice control mode is supported, voice recognition technology or motion recognition technology may be used in the above-described exemplary embodiments. For example, in response to the user making a motion for selecting an object displayed on a home screen or the user giving a voice command corresponding to the object, the user terminal device 1000 determines that the corresponding object is selected and performs a control operation matching the object.

The motion sensor 400 is an element for sensing a motion of the user terminal device 1000. That is, the user terminal device 1000 may be rotated or tilted in various directions. The motion sensor 400 may sense a motion characteristic, such as at least one of a rotation direction, an angle, and a tilt, using at least one of various sensors, such as a geomagnetic sensor, a gyro sensor, an acceleration sensor.

In addition, the user terminal device 1000, according to an exemplary embodiment, may further include various external input ports for connecting with various external terminals such as a USB port to which a USB connector can be connected, a headset, a mouse, a Local Area Network (LAN), a Digital Multimedia Broadcasting (DMB) chip for receiving and processing DMB signals, and various sensors.

Figure 12:
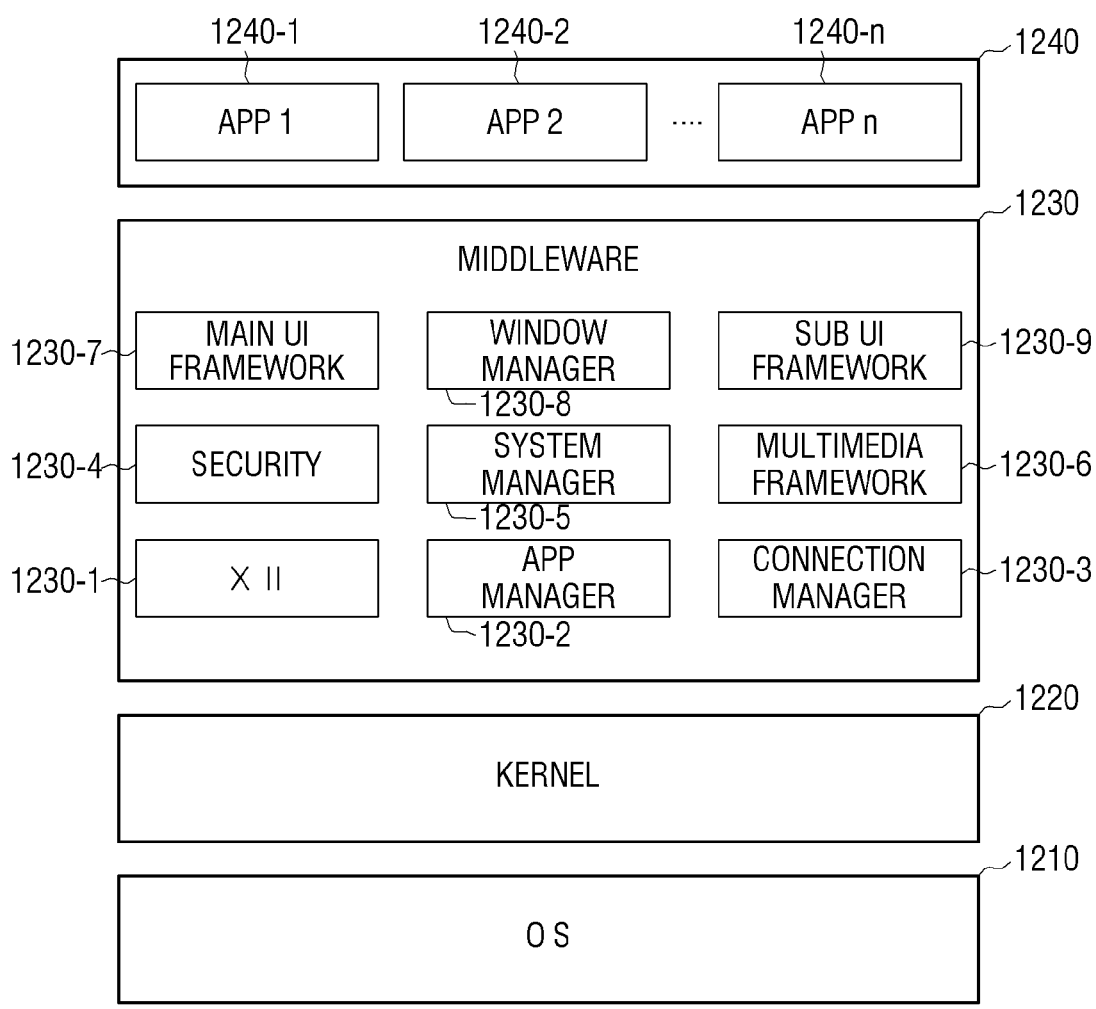
FIG. 12 is a view illustrating an example of a software configuration of a user terminal device according to an exemplary embodiment.

As described above, the storage 310 may store various programs. FIG. 12 is a view illustrating a configuration of software that may be stored in the user terminal device 1000. Referring to FIG. 12, the storage 310 may store software including an OS 1210, a kernel 1220, middleware 1230, and an application 1240.

The OS 1210 controls and manages the overall operations of the hardware. That is, the OS 1210 is a layer which is responsible for basic functions such as hardware management, memory, and security.

The kernel 1220 serves as a channel to transmit various signals including a touch signal detected in the bended touch screen 100 to the middleware 1230.

The middleware 1230 includes various software modules to control the operations of the user terminal device 1000. Referring to FIG. 12, the middleware 1230 includes an X11 module 1230-1, an APP manager 1230-2, a connection manager 1230-3, a security module 1230-4, a system manager 1230-5, a multimedia framework 1230-6, a main UI framework 1230-7, a window manager 1230-8, and a sub UI framework 1230-9.

The X11 module 1230-1 is a module that receives various event signals from a variety of hardware provided in the user terminal device 1000. The event recited herein refers to at least one of an event in which a user gesture is sensed, an event in which a system alarm is generated, an event in which a specific program is executed or ends, or the like.

The APP manager 1230-2 is a module that manages the execution states of various applications 1240 installed in the storage 310. In response to an application execution event being detected by the X11 module 1230-1, the APP manager 1230-2 calls and executes an application corresponding to the event.

The connection manager 1230-3 is a module that supports wired or wireless network connection. The connection manager 1230-3 may include various sub modules such as a DNET module, a Universal Plug and Play (UPnP) module, and the like.

The security module 1230-4 is a module which supports certification, permission, and secure storage for the hardware.

The system manager 1230-5 monitors the states of the elements of the user terminal device 1000, and provides the result of the monitoring to the other modules. For example, in response to a battery life level being low, an error being generated, or communication being disconnected, the system manager 1230-5 provides the result of the monitoring to the main UI framework 1230-7 or the sub UI framework 1230-9 and outputs a notification message or a notification sound.

The multimedia framework 1230-6 is a module that reproduces multimedia contents that are stored in the user terminal device 1000 or provided from external sources. The multimedia framework 1230-6 may include at least one of a player module, a camcorder module, a sound processing module, and the like. Accordingly, the multimedia framework 1230-6 may reproduce various multimedia contents, generate a screen and a sound, and reproduce the same.

The main UI framework 1230-7 is a module that provides various UIs to be displayed on the main area of the bended touch screen 100, and the sub UI framework 1230-9 is a module that provides various UIs to be displayed on the sub area. The main UI framework 1230-7 and the sub UI framework 1230-9 may include an image compositor module to configure various objects, a coordinates compositor module to calculate coordinates for displaying the objects, a rendering module to render the configured objects on the calculated coordinates, a 2D/3D UI toolkit to provide a tool for configuring a UI in the form of 2D or 3D.

The window manager 1230-8 may detect a touch event that is generated using a user's body or a pen, or other input events. In response to such an event being detected, the window manager 1230-8 transmits an event signal to the main UI framework 1230-7 or the sub UI framework 1230-9 such that an operation corresponding to the event is performed.

In addition, various program modules may be stored such as a writing module that, when the user touches or drags on the screen, draws a line by tracing the dragged line, or an angle calculation module that calculates a pitch angle, a roll angle, and a yaw angle based on a sensor value detected by the motion sensor 400.

The application module 1240 includes applications 1240-1 to 1240-n to support various functions. For example, the application module 1240 may include program modules to provide various services, such as a navigation program module, a game module, an electronic book module, a calendar module, a notification management module, and the like. The applications may be set by default or may be temporarily set and used when the user uses the applications. In response to an object being selected, the CPU 230 may execute an application corresponding to the selected object using the application module 1240.

The software configuration shown in FIG. 12 is merely an example and one or more exemplary embodiments are not limited to this. Therefore, some of the elements may be omitted or changed or an element may be added when necessary. For example, the storage 310 may additionally be provided with various programs such as a sensing module to analyze signals sensed by various sensors, a messaging module such as a messenger program, a Short Message Service (SMS) & Multimedia Message Service (MMS) program, an email program, a call information aggregator program module, a VoIP module, a web browser module, and the like.

The user terminal device 1000 may be implemented with various kinds of devices such as a mobile phone, a tablet PC, a laptop PC, a PDA, an MP3 player, an electronic album device, a TV, a PC, a kiosk, etc. Therefore, the configurations described in FIGS. 11 and 12 may be changed according to the kind of the user terminal device 1000.

Also, the user terminal device 1000 may be implemented in various shapes and configurations. The controller 300 of the user terminal device 1000 may support various user interactions according to an exemplary embodiment.

Next, a user interaction method according to one or more exemplary embodiments will be described.

According to an exemplary embodiment, in response to a predetermined event occurring, the controller 300 may perform an operation corresponding to the predetermined event. The predetermined event may be sensing a user manipulation. For example, the predetermined event may include events related to various user manipulations, such as an event in which a predetermined touch gesture is sensed or an event in which a predetermined motion of the user terminal device 1000 is sensed.

The touch gesture may include various gestures, such as a gesture of touching one point and then moving to another point while still touching (e.g., dragging), a gesture of touching one point and rubbing (e.g., rubbing), a gesture of pressing one point for more than a threshold time (e.g., long pressing or holding), a gesture of touching one point and then flicking in one direction rapidly (e.g., flicking), and a gesture for slightly touching with the end of the finger (e.g., tapping).

In response to a predetermined event being sensed, the controller 300 may control the flexible display 100 to display a one or more UI elements which are individually displayable on the sub areas and the main area. In addition, the controller 300 might not display the UI elements only on the main area, but may display some of the plurality of UI elements on the sub areas and display some UI elements on the main area.

The UI element which is displayable on the sub areas has the display layout of the sub areas. The layout refers to information about the size, shape, arrangement position, arrangement order of an area which is pre-set for displaying a variety of information. Hereinafter, the "UI element which is displayable on the sub areas" will be referred to as a "UI element" for convenience of explanation.

The user terminal device 1000 may provide various UI elements. For example, the user terminal device 1000 may provide a UI element for adjusting the volume of the user terminal device 1000, a UI element for adjusting the brightness of the screen, a UI element which collects bookmark icons, a UI element including information on stocks of interest, a UI element for reproducing music or a moving image, and the like. Also, desired UI elements may be registered and used. Information on the registration/non-registration of the UI element is stored in the storage 310.

Figure 13:
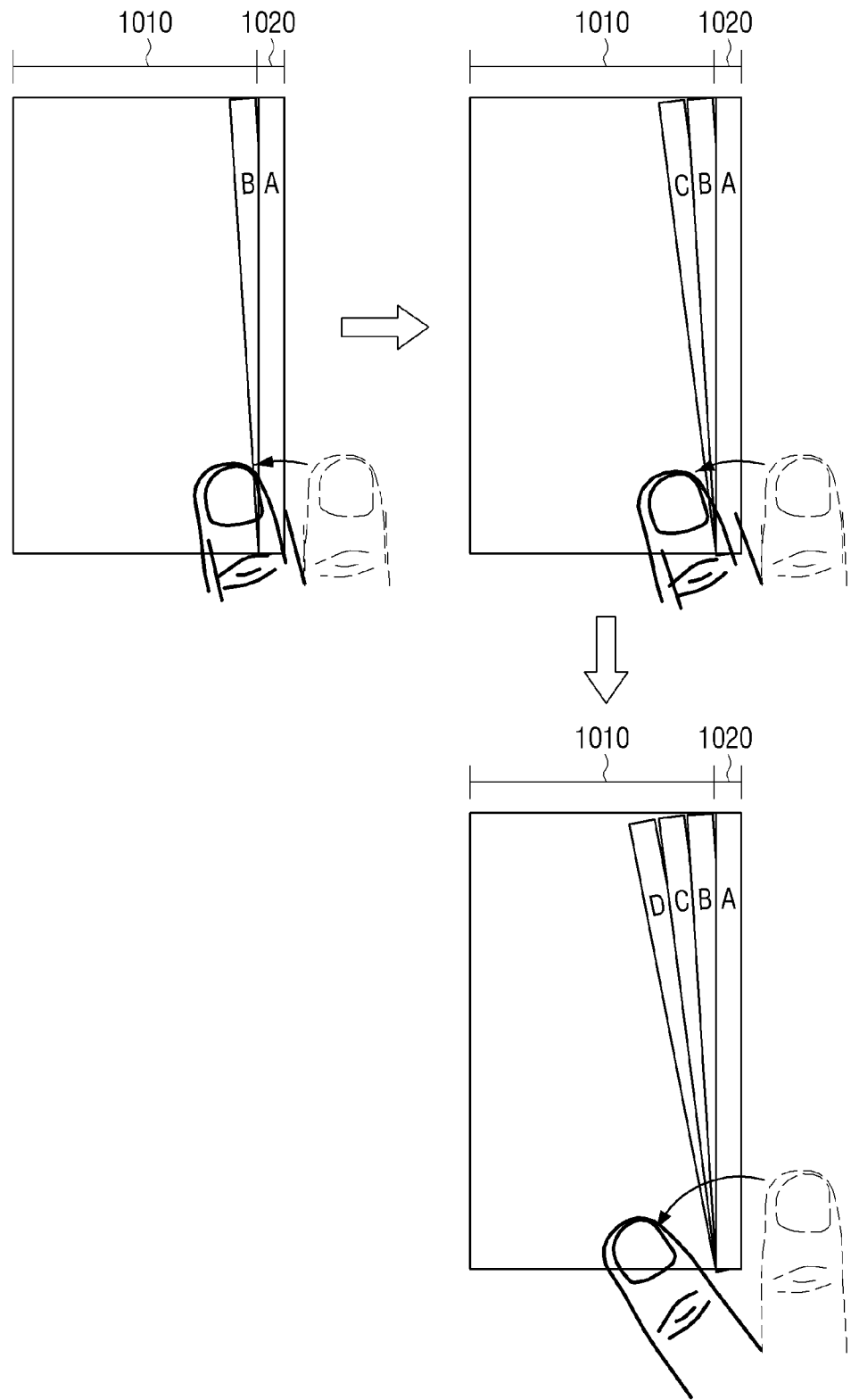
Figure 14:
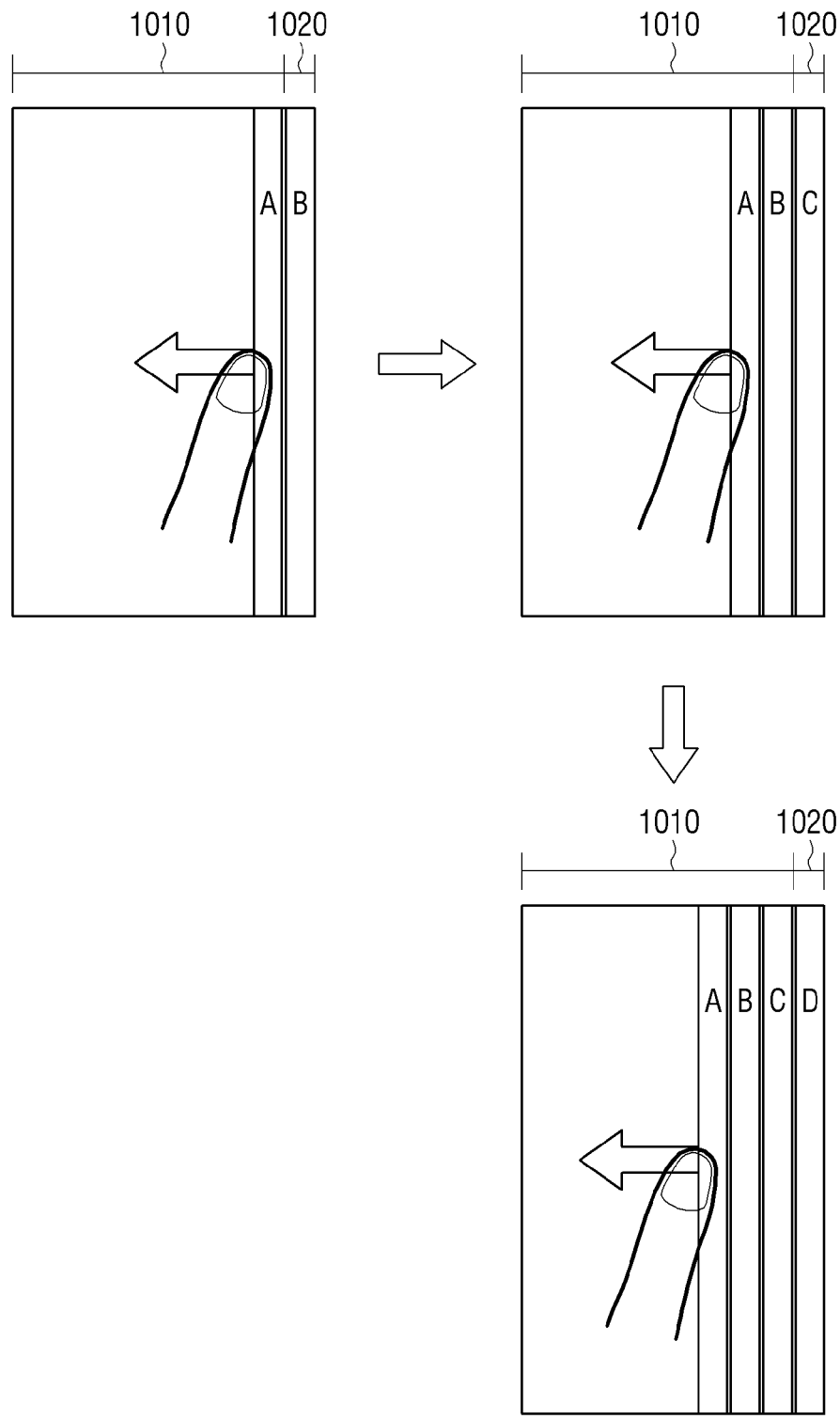
Figure 15:
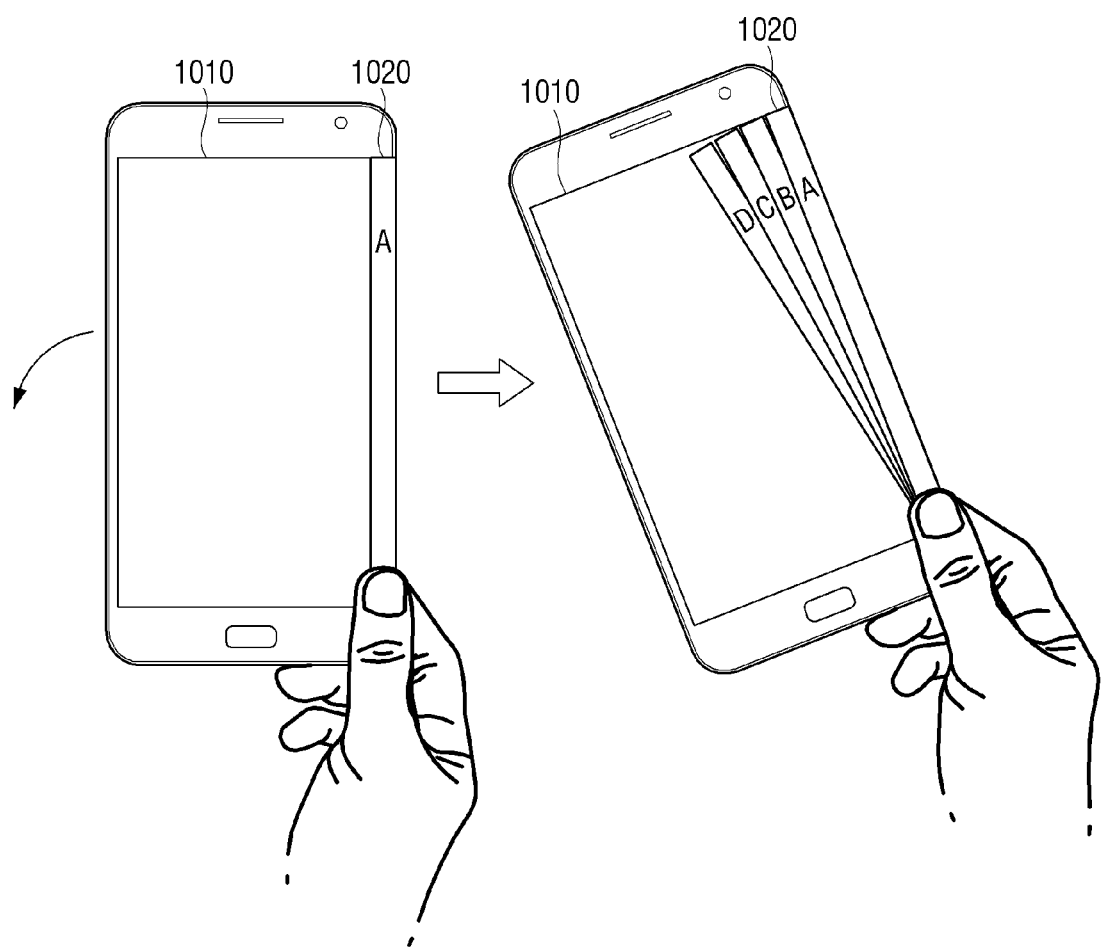

In response to a predetermined event being sensed, the controller 300 may display the registered UI elements on the main area. FIGS. 13 to 15 are views to illustrate an exemplary embodiment related to this.

In the following one or more exemplary embodiments, it is assumed that a single sub area is provided and reference numeral 1010 is used for the main area of the flexible display 100 and reference numeral 1020 is used for the sub area of the flexible display 100.

Referring to FIG. 13, in response to a touch gesture of moving from the sub area 1020 to the main area 1010 being sensed, the controller 300 may display UI element A and UI element B on the main area 1010, or may display UI element A, which has been originally displayed on the sub area 1020, on the sub area 1020 as it is, and display UI element B on the main area 1010. In addition, in response to a continuous touch gesture being sensed, the controller 300 may further display additional UI element C and UI element D on the main area 1010. The touch gesture in this example may be a touch gesture of extending from the initial touch point toward a final touch point, which is lower than the initial touch point, for example, a touch gesture of drawing a circular arc.

FIG. 14 is a view illustrating a plurality of UIs which are displayed on the main area 1010 using a touch gesture different from that of FIG. 13.

Referring to FIG. 14, in response to a touch gesture of moving from the sub area 1020 to the main area 1010 in a straight line, the controller 300 may display UI element A and UI element B on the main area 1010, or may display UI element A, which has been originally displayed on the sub area 1020, on the sub area 1020 as it is, and display UI element B on the main area 1010. In response to a continuous touch gesture being sensed, the controller 300 may further display additional UI element C and UI element D.

As described above with reference to FIGS. 13 and 14, the controller 300 may change the number of UI elements to be displayed on the main area 1010 according to the length of a touch gesture, and may display the UI elements. The order in which the UI elements appear in the main area may be changed according to settings. For example, in response to a touch gesture extending from the sub area 1020 toward the main area 1010 being sensed, the controller 300 may display the UI element which has been displayed on the sub area 1010 as a leading element and display the other UI elements to follow, or may set the UI element displayed on the sub area 1020 as a last element and display the other UI elements on the main area 1010 in sequence. For example, the UI elements may be displayed in order of D-C-B-A as shown in FIG. 13 or may be displayed in order of A-B-C-D as shown in FIG. 14.

More touch gestures may be inputted in addition to the touch gestures described in FIGS. 13 and 14. Also, the above-described operation may be performed in response to a motion of the user terminal device 100 being sensed, in addition to the touch gesture being sensed. That is, according to another exemplary embodiment, in response to a predetermined motion of the user terminal device 1000 being sensed, the plurality of UI elements displayed on the sub area may be displayed on the main area. FIG. 15 is a view illustrating an exemplary embodiment related to this.

Referring to FIG. 15, in response to a motion of the user terminal device 1000 accelerating in a predetermined direction being sensed by the motion sensor 400 (similar to a fan being opened up), the controller 300 may display UI element A, UI element B, UI element C, and UI element D on the main area 1010 as if the UI elements are spread in the direction in which the acceleration is sensed, or it may display UI element A, which has been originally displayed on the sub area 1020, on the sub area 1020 as it is and display the other UI elements on the main area 1010.

Also, in response to an accelerating motion of the user terminal device 1000 being sensed while a touch on a certain area of the sub area 1020 is being maintained, the controller 300 may display UI element A, UI element B, UI element C, and UI element D on the main area 1010 as if the UI elements are spread in the direction in which the acceleration is sensed, or may display UI element A, which has been originally displayed on the sub area 1020, on the sub area 1020 as it is, and display the other UI elements on the main area 1010. That is, a combination of a touch gesture and a motion gesture may be used.

In response to an accelerating motion of the user terminal device 1000 in the opposite direction to the direction in which the UI elements are spread being sensed while the plurality of UI elements are displayed, the controller 300 may control the UI elements displayed on the main area 1010 to disappear.

According to one or more exemplary embodiments illustrated in FIGS. 13 to 15, the user can identify the plurality of UI elements which are pre-registered at a time and thus a user's convenience can be enhanced.

In addition, the user may identify the plurality of UI elements displayed on the main area 1010, select one of them, and the controller 300 may display the selected UI element on the sub area 1020. The UI element may be selected, for example, by touching one of the plurality of UI elements displayed on the main area 1010. Alternatively, the user may change one of the plurality of UI elements displayed on the main area 1010 to a movable state by long-pressing the UI element, and then move the UI element to the sub area 1020 by dragging. In addition, the user may select one of the plurality of UI elements using various methods.

According to an exemplary embodiment, the user may select a UI element by moving the UI element to a specific location. An exemplary embodiment related to this is illustrated in FIGS. 16 to 17.

Figure 16:
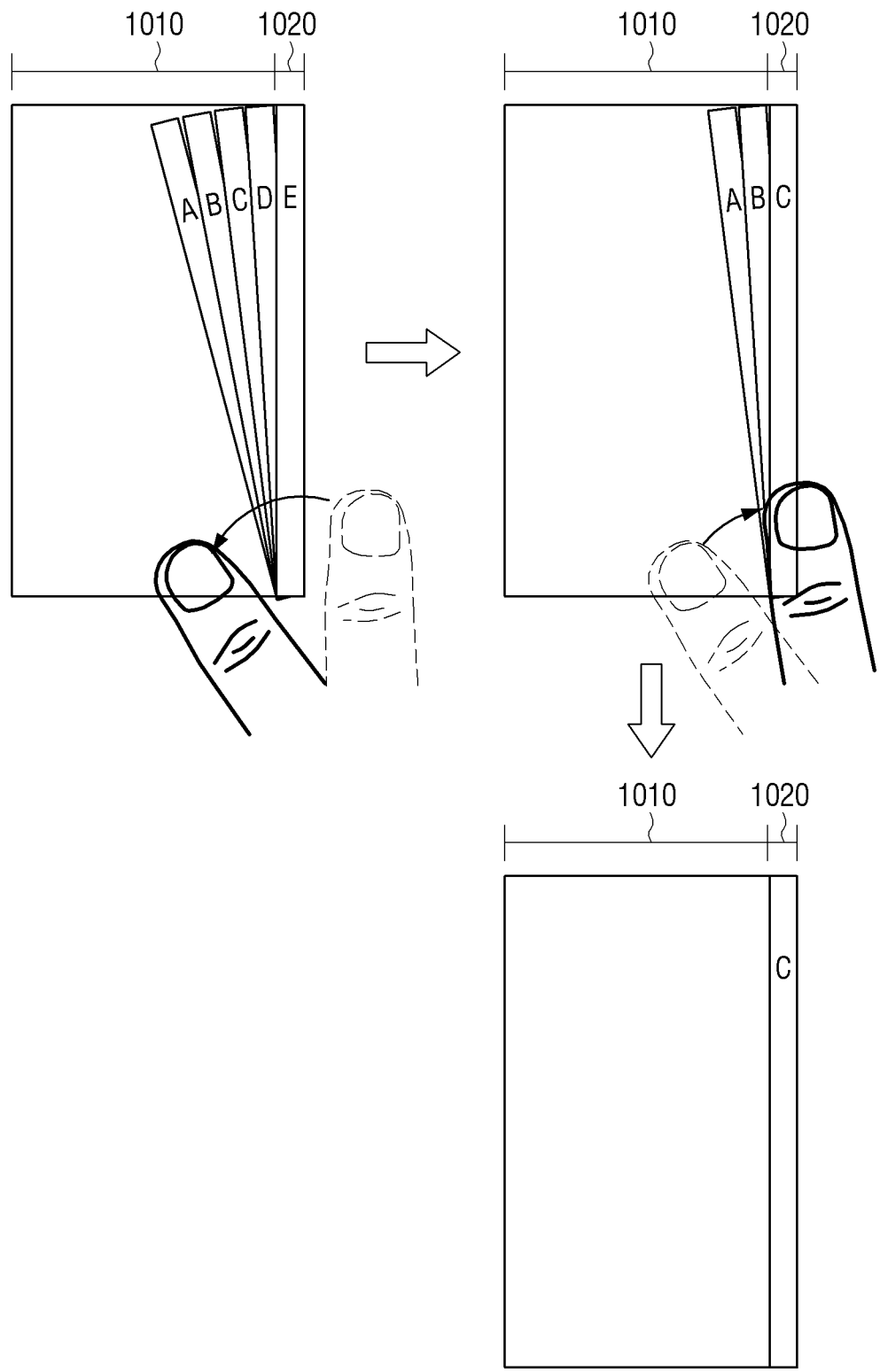
Figure 17:
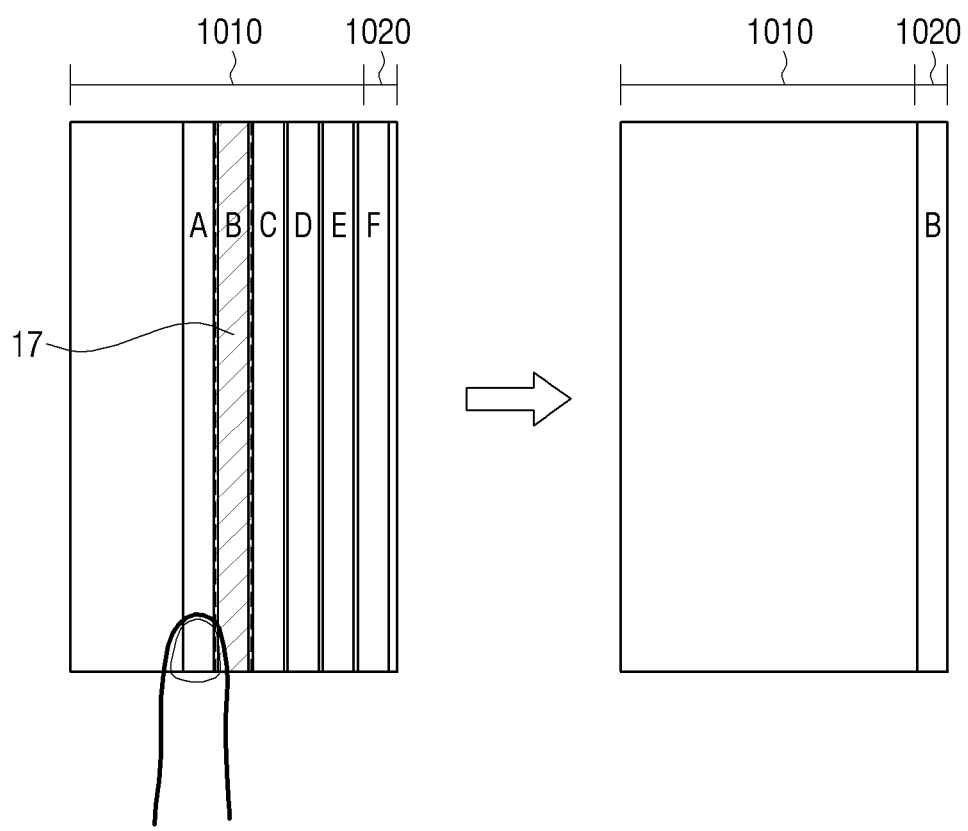

Referring to FIG. 16, the controller 300 may increase the number of UI elements displayed on the main area 1010 according to a touch gesture, and display the UI elements. Likewise, the controller 300 may display the UI elements while reducing the number of UI elements displayed on the main area 1010 according to a touch gesture. Specifically, when the touch gesture moves from the sub area 1020 to the main area 1010, the number of UI elements increases, and, when the touch gesture moves from the main area 1010 to the sub area 1020, the number of UI elements is reduced.

That is, the controller 300 may change the number of UI elements displayed on the main area 1010 according to the length of the touch gesture, and display the UI elements. In this case, in response to the touch gesture being released (for example, when the touch gestures are not sensed any more, e.g., when the user lifts the user's finger from the flexible display) as shown in FIG. 16, UI element C which is displayed on the sub area 1020 at the time when the touch gesture is released may be selected. The selected UI element C is displayed on the sub area 1020 and the other UI elements A and B disappear.

In FIG. 16, the UI element which is located on the sub area 1020 at the time when the touch gesture is released is selected. However, according to another exemplary embodiment, in response to a touch gesture being released after a UI element is placed on a predetermined location of the main area 1010, the UI element may be selected, as shown in FIG. 17.

Referring to FIG. 17, a graphic object 17 highlighting an area for placing a UI element to be selected may be displayed on the main area 1010. In FIG. 17, the graphic object 17 is illustrated as a shadow and UI element B is located on the graphic object 17. In this state, in response to a touch gesture being released by the user, UI element B is selected and displayed on the sub area 1020, and the other UI elements A, C, D, E, and F disappear. If the user wants to select UI element C with UI element B being located on the graphic object 17, the user may place UI element C on the graphic object 17 by moving to the right by a predetermined distance without lifting the user's finger from the flexible display 100, and may select UI element C by lifting the user's finger in that state, such that UI element C is displayed on the sub area 1020.

In the above-described exemplary embodiments, the plurality of UI elements are displayed on the main area 1010. However, according to an exemplary embodiment, the plurality of UI elements may be identified on the sub area one by one. According to an exemplary embodiment, in response to a flick gesture being sensed on the sub area 1020, the controller 300 may change a UI element displayed on the sub area 1020 to another UI element that may be pre-registered, as shown in FIG. 18.

Referring to FIG. 18, in response to a flick gesture being sensed while UI element A is being displayed on the sub area 1020, the controller 300 may display UI element B which is different from UI element A. For example, UI element A which is originally displayed disappears in the upward direction in which the flick gesture is made and another UI element B appears as shown in FIG. 18. According to an exemplary embodiment, the user may repeat the flick gesture on the sub area 1020 until a desired UI element appears. If such a repeating operation makes the user feel fatigued, the user may list all of the plurality of UI elements at one time and identify the UI elements as described above.

The user terminal device 1000 may provide various UI elements. For example, the user terminal device 1000 may provide a UI element for adjusting the volume of the user terminal device 1000, a UI element for adjusting the brightness of the screen, a UI element which collects bookmark icons, a UI element including information on stocks of interest, a UI element for reproducing music or a moving image, and the like. Some of the UI elements may be unnecessary for a particular user. Therefore, according to an exemplary embodiment, the user may register only desired UI elements and use those desired UI elements.

For example, when ten UI elements are supported in the user terminal device 1000, the user may select only four UI elements and register the four UI elements. In response to a predetermined event being sensed, the controller 300 may display the four pre-registered UI elements on the main area 1010 according to the above-described exemplary embodiments.

Figure 19:
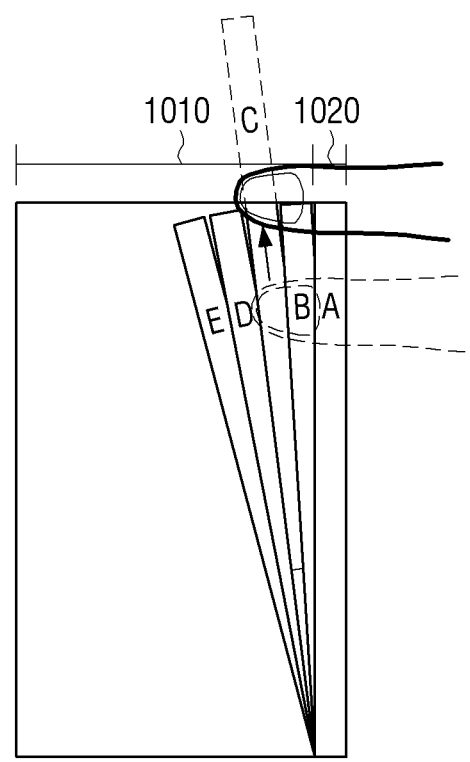

Next, a method for editing a pre-registered UI element will be described with reference to FIGS. 19 and 20.

According to an exemplary embodiment, in response to a predetermined touch gesture on at least one of a plurality of UI elements displayed on the main area 1010 being sensed, the controller 300 may exclude the UI element in which the predetermined touch gesture is sensed from pre-registered UI elements which are displayable on the sub area. The predetermined touch gesture may be a touch gesture for separating one of the plurality of UI elements displayed on the main area 1010 from the other UI elements. For example, as shown in FIG. 19, UI element C may be separated from the other UI elements A, B, D, and E by pushing up UI element C. As a result, UI element C is excluded from the pre-registered UI elements and thus only UI elements A, B, D, and E are displayed on the main area 1010 after the touch gesture.

Also, an operation of changing the order of UI elements may be performed. For example, in response to UI element C being long-pressed while UI elements A, B, C, D, and E are displayed, the controller 300 may change UI element C to a movable state, and, in response to a user touch gesture, the controller 300 may place UI element C between UI elements D and E. Accordingly, the display order of A-B-C-D-E may be changed to the order of A-B-D-C-E.

The user terminal device 1000 may reregister a UI element which has been deregistered. To achieve this, the user terminal device 1000 may provide a screen for editing a UI element.

According to an exemplary embodiment, in response to a multi-touch continuing from the sub area 1020 to the main area 1010 being sensed, the controller 300 may display a screen for editing the UI element displayable on the sub area 1020 on the main area 1010. The multi-touch is technology for recognizing touching at two points distanced from each other simultaneously.

Figure 20:
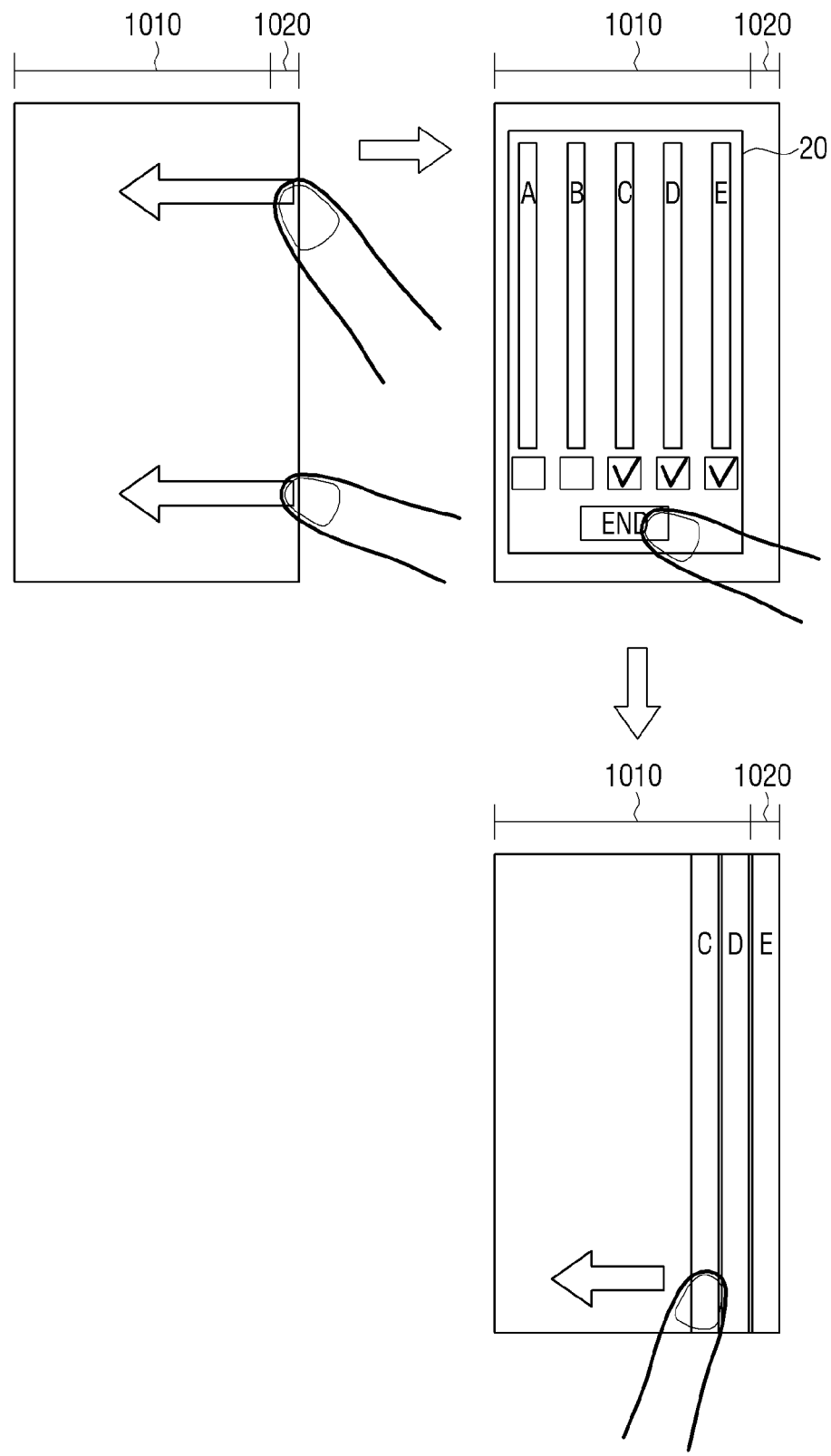

For example, as shown in FIG. 20, in response to a multi-touch gesture for touching two or more points of the sub area 1020 and moving them to the main area 1010 being sensed, the controller 300 may display an editing screen 20 on the main area 1010. As shown in FIG. 20, on the editing screen 20, all of the UI elements provided by the user terminal device 1000 are displayed, a radio button of the registered UI elements is checked, and a radio button of the deregistered UI elements is unchecked. That is, in FIG. 20, UI elements A and B are deregistered and UI elements C, D, and E are registered. In response to an OK button being selected, settings are stored. As a result, in response to a predetermined event occurring (for example, in response to a touch gesture for moving from the sub area 1020 to the main area 1010 being sensed), the controller 300 displays only the registered UI elements C, D, and E on the main area 1010.

In addition, the order of the UI elements may be changed on the editing screen 20. For example, the order may be changed by long-pressing a UI element on the editing screen 20 and moving the UI element.

The user terminal device 1000 may be programmed to perform a different display operation instead of displaying the editing screen in response to such a multi-touch gesture. For example, in response to a multi-touch gesture continuing from the sub area 1020 to the main area 1010 being sensed, the controller 300 may display an extension UI element extended from a UI element displayed on the sub area 1020 on the main area 1020, as shown in FIG. 21.

Figure 21:
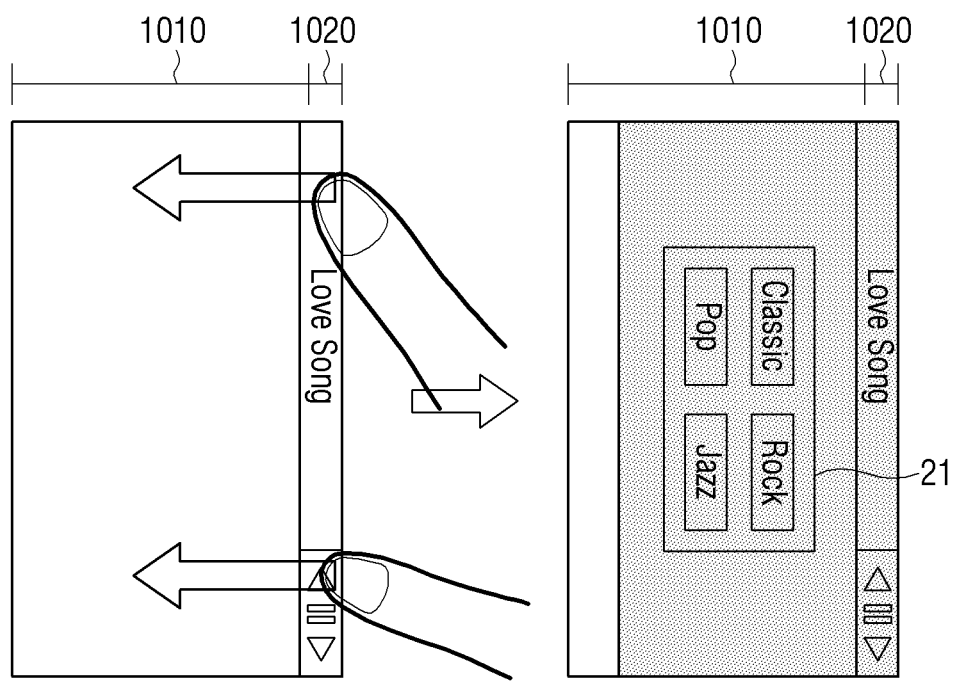

Referring to FIG. 21, in response to a multi-touch gesture moving from the sub area 1020 to the main area 1010 being sensed while a UI element related to music replay is displayed on the sub area 1020, the controller 300 may display a sub menu for the UI element related to music replay on the main area 1010. For example, an Equalizer (EQ) menu screen 21 for changing the frequency characteristic of music may be displayed as shown in FIG. 21. According to an exemplary embodiment, the user may be provided with the function provided on the sub area 1020 and also with a sub menu including relevant functions on the main area 1010.

In addition, the controller 300 may change the size of the sub menu according to the length of the multi-touch gesture. That is, the size of the sub menu may correspond to the length of the touch gesture continuing from the sub area 1020 to the main area 1010.

The multi-touch gesture may be performed with a different method from the above-described method. For example, in response to a multi-touch gesture for touching one point of the main area 1010 and one point of the sub area 1020 simultaneously being sensed, the same operation as the above-described operation may be performed. In this case, the size of the sub menu may be determined according to a distance between the touch point of the main area 1010 and the touch point of the sub area 1020.

The sub menu on the sub area may be displayed on the main area 1010 using various methods in addition to the above-described method of an exemplary embodiment of FIG. 21.

Figure 22A:
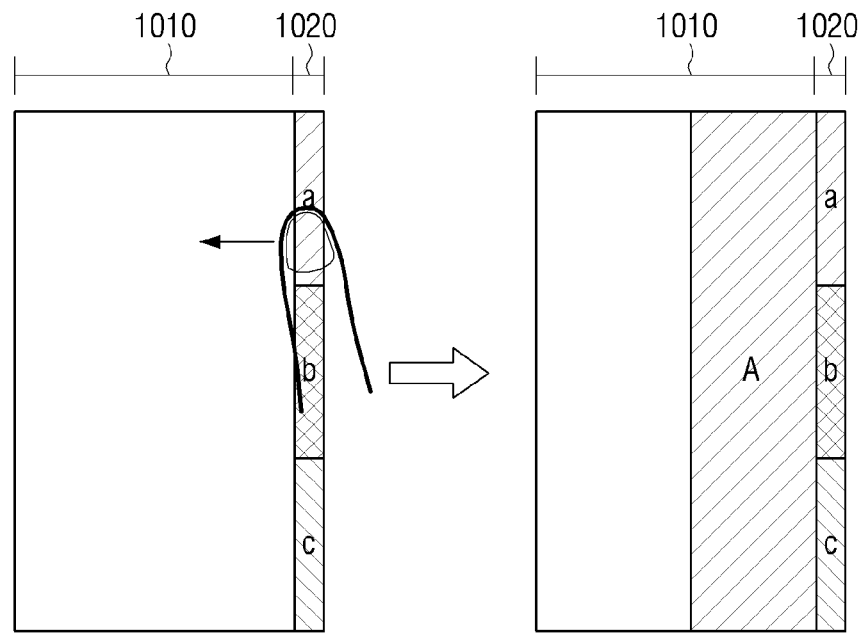
Figure 22B:
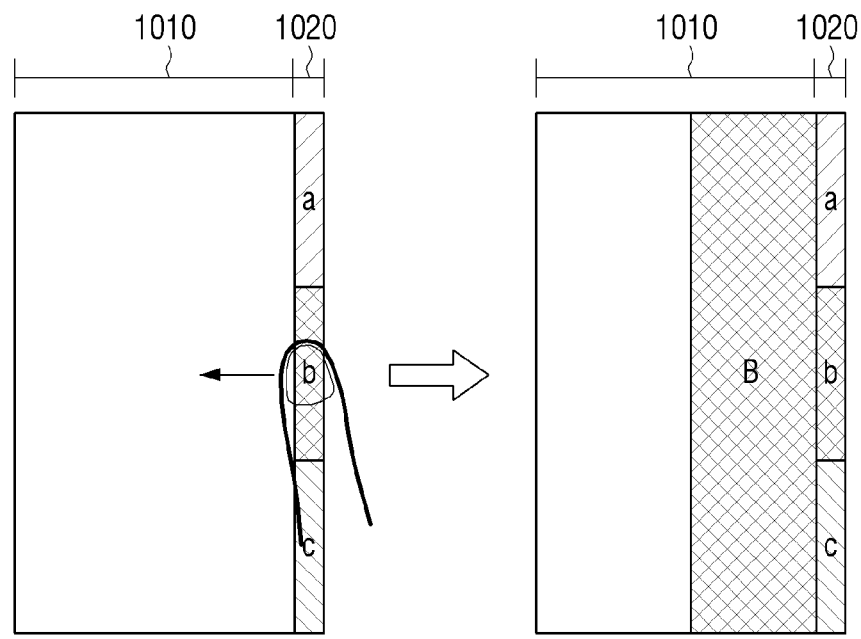

Specifically, the sub area 1020 may be divided into a plurality of sub areas, and, in response to a touch gesture for moving to the main area 1010 being sensed in one of the plurality of sub areas, the controller 300 may display sub menus on the sub area 1020 on the main area 1010, as shown in FIGS. 22A and 22B.

Referring to FIGS. 22A and 22B, the sub area 1020 is divided into areas 'a,' 'b,' and 'c,' and, in response to a touch gesture for moving to the main area 1010 being sensed in area 'a,' the controller 300 may display sub menu A related to area 'a' on the main area 1010. Likewise, in response to a touch gesture for moving to the main area 1010 being sensed in area 'b,' the controller 300 may display sub menu B related to area 'b' on the main area 1010. Likewise, in response to a touch gesture for moving to the main area 1010 being sensed in area 'c,' the controller 300 may display a sub menu related to area 'c' on the main area 1010.

For example, if it is assumed that the UI elements currently displayed on the sub area 1020 provide a function related to setting of Wi-Fi (area 'a'), a ringer (area 'b'), and Bluetooth (area 'c'), then in response to area 'a' being touched, Wi-Fi is turned on or off, in response to area 'b' being touched, the user terminal device 1000 enters one of a silent mode, a vibration mode, and a bell sound mode, and, in response to area 'c' being touched, Bluetooth is turned on or off.

In this example, in response to a touch gesture continuing from area 'a' to the main area 1010 being sensed, the controller 300 may display a list of connectable Wi-Fi access points on sub menu A related to area 'a,' in response to a touch gesture continuing from area 'b' to the main area 1010 being sensed, the controller 300 may display a list of bell sounds on sub menu B related to area 'b,' and, in response to a touch gesture continuing from area 'c' to the main area 1010 being sensed, the controller 300 may display a list of Bluetooth-connectable neighboring devices on a sub menu related to area 'c.'

The above-described examples are merely exemplary embodiments, and other various sub menus may be displayed on the main area 1010 according to a UI element displayed on the sub area 1020.

According to one or more exemplary embodiments, the user may identify the plurality of UI elements displayable on the sub area and/or the main area, which is larger than the sub area, and may be provided with more diverse information by extending the UI element displayed on the sub area to the main area.

Next, a method for controlling the user terminal device 1000 will be explained in detail with reference to a flowchart.

Figure 23:
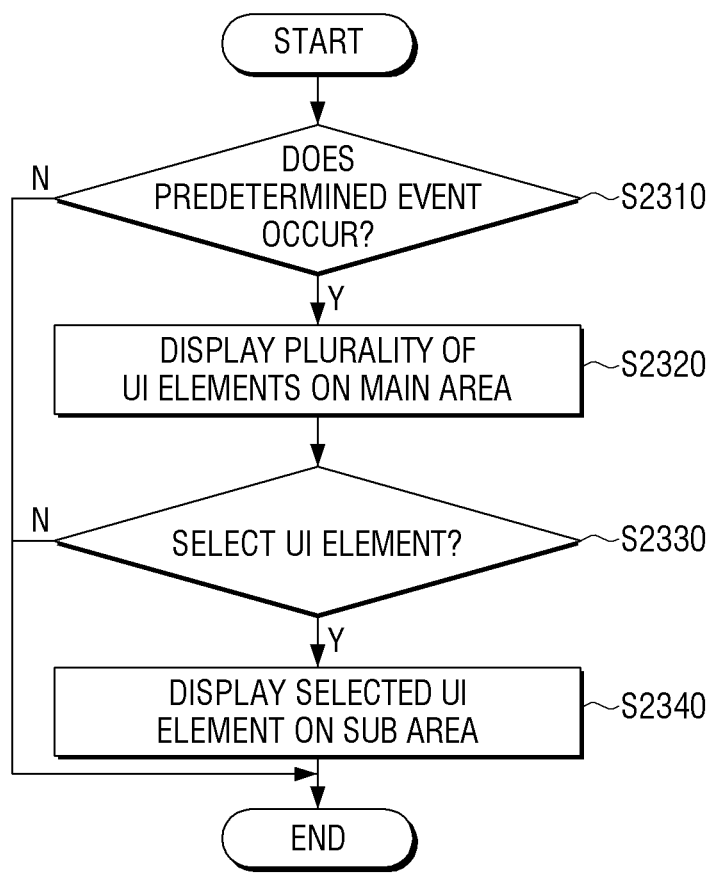
FIG. 23 is a flowchart illustrating a method for controlling a user terminal device according to an exemplary embodiment.

FIG. 23 is a flowchart to illustrate a method for controlling a user terminal device having a flexible display according to an exemplary embodiment. Referring to FIG. 23, in response to a predetermined event occurring (S2310-Y), the user terminal device 1000 may display, on the main area of the flexible display, a plurality of UI elements that are individually displayable on the sub area of the flexible display (S2320). The predetermined event may include various events, such as an event in which a predetermined point of the sub area or the main area is touched, an event in which a touch gesture continuing from the sub area to the main area is sensed, an event in which an accelerating motion of the user terminal device 1000 in a predetermined direction is sensed.

In this state, in response to one of the plurality of UI elements displayed on the main area being selected (S2330-Y), the user terminal device 1000 may display the selected UI element on the sub area (S2340). The UI element may be selected with various methods. For example, the user may select one of the plurality of UI elements displayed by directly touching it. In addition, the user may select a UI element by moving the UI element to a predetermined location of the flexible display and then releasing the touch gesture. In this case, the predetermined location may exist on the main area or the sub area according to an exemplary embodiment. In order to move a specific UI element to a predetermined location, various touch gestures may be used. For example, a touch gesture for moving from the sub area to the main area or moving from the main area to the sub area may be used. In this case, the number of UI elements displayed increases in response to the touch gesture moving from the sub area to the main area, and the number of UI elements displayed may be reduced in response to the touch gesture moving from the main area to the sub area. When the number of UI elements is reduced, a graphic effect as if the UI elements disappear out of the sub area may be displayed. In addition, the user may directly move a UI element from the main area to the sub area by long-pressing the UI element.

The user terminal device 1000 may display the UI element selected on the sub area. In addition, the user terminal device may stop displaying the UI elements which are not selected.

In addition, the user can control the user terminal device 1000 through the UI element displayed on the sub area, and can be provided with a variety of information. In an exemplary embodiment, the user can control the user terminal device 1000 through the UI element when the UI element is displayed on the sub area. However, when the UI element is displayed on the main area, the user can control the user terminal device 1000 through the UI element displayed on the main area.

The size of the UI element is constant in the drawings, but may be varied in an exemplary embodiment. Also, the size of the UI element may vary according to whether the UI element is displayed on the sub area or the main area. For example, the size of the UI element may be magnified when displayed on the main area. According to an exemplary embodiment, the inconvenience caused when a UI element is displayed on the sub area with a relatively smaller size, for example, with older people and people with poor eyesight, can be improved.

As described above, the user terminal device may support various control methods. One or more exemplary embodiments may be separately implemented or may be combined without limitation.

A method for controlling the user terminal device according to the above-described one or more exemplary embodiments may be stored in a non-transitory computer readable medium. The non-transitory computer readable medium may be mounted and used in various devices.

The non-transitory computer readable medium may refer to a medium that stores data semi-permanently rather than storing data for a very short time, such as a register, a cache, and a memory, and is readable by an apparatus. For example, the non-transitory readable medium may be a compact disc (CD), a digital versatile disk (DVD), a hard disk, a Blu-ray disk, a universal serial bus (USB), a memory card, and a read only memory (ROM).

A program code for performing, in response to a predetermined event occurring, displaying, on a main area, a plurality of UI elements individually displayable on a sub area; and, in response to one of the plurality of UI elements displayed on the main area being selected, displaying the selected UI element on the sub area may be stored in the non-transitory readable medium and provided.

The foregoing exemplary embodiments and advantages are merely exemplary and are not to be construed as limiting the present disclosure. One or more exemplary embodiments can be readily applied to other types of apparatuses. Also, the description of exemplary embodiments is intended to be illustrative, and not to limit the scope of the claims, and many alternatives, modifications, and variations should be apparent to those skilled in the art.

What is claimed is:

1. A user terminal device comprising:
a flexible display that is divided into a main area, which is disposed on a front surface of the user terminal device, and a sub area, which includes a bent portion extending from the main area toward a side surface of the user terminal device;
a touch sensor configured to receive a touch input of a user in at least one of the main area and the sub area; and
a controller configured to, in response to a touch gesture moving from the sub area to the main area in a direction away from an edge of the user terminal device toward a center of the main area, control the flexible display to display, in the main area, a plurality of user interface (UI) elements such that a total number of the plurality of UI elements increases in accordance with an increasing length of the touch gesture moving in the direction away from the edge of the user terminal device, and in response to one of the plurality of UI elements displayed in the main area being selected, control the flexible display to display the selected UI element in the sub area.

2. The user terminal device of claim 1, wherein the controller is further configured to, in response to sensing that the touch gesture is released, control the flexible display to display a UI element in a predetermined location in the sub area.

3. The user terminal device of claim 1, wherein the controller is configured to, in response to sensing that a multi-touch gesture continues from the sub area to the main area, control the flexible display to display, in the main area, a screen for editing the UI elements that are displayed in the sub area.

4. The user terminal device of claim 1, wherein the controller is further configured to, in response to sensing a predetermined touch gesture corresponding to at least one of the plurality of UI elements that are displayed in the main area, exclude the UI element to which the predetermined touch gesture corresponds from pre-registered UI elements that are displayed in the sub area.

5. The user terminal device of claim 4, wherein the predetermined touch gesture is a touch gesture for separating one of the plurality of UI elements displayed in the main area from the other UI elements displayed in the main area.

6. The user terminal device of claim 1, wherein the controller is further configured to, in response to sensing a flick gesture in the sub area, control the flexible display to change the UI element displayed in the sub area to another pre-registered UI element.

7. The user terminal device of claim 1, wherein the sub area is divided into a plurality of sub areas, and the controller is further configured to, in response to sensing a touch gesture moving from one of the plurality of sub areas to the main area, control the flexible display to display sub menus corresponding to the sub area in the main area.

8. A method for controlling a user terminal device, the method comprising:
dividing a flexible display into a main area, which is disposed on a front surface of the user terminal device, and a sub area, which includes a bent portion extending from the main area toward a side surface of the user terminal device;
receiving a touch input of a user in at least one of the main area and the sub area;
in response to a touch gesture moving from the sub area to the main area in a direction away from an edge of the user terminal device toward a center of the main area, displaying, in the main area, a plurality of user interface (UI) elements such that a total number of the plurality of UI elements increases in accordance with an increasing length of the touch gesture moving in the direction away from the edge of the user terminal device; and
in response to one of the plurality of UI elements displayed in the main area being selected, displaying the selected UI element in the sub area.

9. The method of claim 8, wherein the displaying the UI element in the sub area comprises, in response to sensing that the touch gesture is released, displaying a UI element in a predetermined location in the sub area.

10. The method of claim 8, further comprising, in response to sensing that a multi-touch gesture continues from the sub area to the main area, displaying, in the main area, a screen for editing the UI elements that are displayed in the sub area.

11. The method of claim 8, further comprising, in response to sensing a predetermined touch gesture corresponding to at least one of the plurality of UI elements that are displayed in the main area, excluding the UI element to which the predetermined touch gesture corresponds from pre-registered UI elements that are displayed in the sub area.

12. The method of claim 11, wherein the predetermined touch gesture is a touch gesture for separating one of the plurality of UI elements displayed in the main area from the other UI elements displayed in the main area.

13. The method of claim 8, further comprising, in response to sensing a flick gesture in the sub area, changing the UI element displayed in the sub area to another pre-registered UI element.

14. The method of claim 8, further comprising:
- dividing the sub area into a plurality of sub areas, and
- in response to sensing a touch gesture moving from one of the plurality of sub areas to the main area, displaying sub menus corresponding to the sub area in the main area.

15. A non-transitory computer readable recording medium which comprises a program for executing a method for controlling a user terminal device, the method comprising:
- dividing a flexible display into a main area, which is placed on a front surface of the user terminal device, and a sub area, which includes a bent portion extending from the main area toward a side surface of the user terminal device;
- receiving a touch input of a user in at least one of the main area and the sub area;
- in response to a touch gesture moving from the sub area to the main area in a direction away from an edge of the user terminal device toward a center of the main area, displaying, in the main area, a plurality of user interface (UI) elements such that a total number of the plurality of UI elements increases in accordance with an increasing length of the touch gesture moving in the direction away from the edge of the user terminal device; and
- in response to one of the plurality of UI elements displayed in the main area being selected, displaying the selected UI element in the sub area.

\* \* \* \* \*